United States Patent Office 3,215,724
Patented Nov. 2, 1965

3,215,724
α-CYANO-β,β-DIPHENYL ACRYLIC ACID ESTERS
Albert F. Strobel, Delmar, and Sigmund C. Catino, Castleton, N.Y., assignors to General Aniline & Film Corporation, New York, N.Y., a corporation of Delaware
No Drawing. Filed Sept. 18, 1961, Ser. No. 138,574
17 Claims. (Cl. 260—465)

This invention relates to new and useful compounds which impart to organic materials superior resistance to degradation and deterioration when they are exposed to actinic radiation, and in particular to ultra-violet radiation. This invention further relates to processes for the preparation of new and useful compounds of the type hereinbefore described. The compounds with which this invention is concerned are characterized as α-cyano-β,β-diphenylacrylic acid derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining α-cyano-β,β-diphenylacrylic acid derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds of this invention also absorb some visible light on the violet end of the spectrum which renders them particularly useful in many formulations which are susceptible to visible light degradation. Thus polypropylene, cellulose nitrate and polyvinyl chloride are known to be so characterized, and the stabilization of these materials is extremely successful when using the compounds herein contemplated.

In addition, polypropylene and high polymers of formaldehyde (polyoxymethylene) are stabilized to a most remarkable and unexpected degree by the compounds of this invention. The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not a disadvantage, or detriment where alkaline sensitivity is no problem.

It is therefore an object of the present invention to provide new and useful compounds characterized by outstanding ultra-violet absorbing properties.

It is still another object of this invention to provide new and useful α-cyano-β,β-diphenylacrylic acid derivatives which are outstanding ultra-violet absorbing compounds.

It is a still further object of the present invention to provide processes for the preparation of new and useful ultra-violet absorbing compounds.

It is a still further object of the present invention to provide processes for the preparation of new and useful ultra-violet absorbing compounds which are derivatives of α-cyano-β,β-diphenylacylic acid.

Other objects will appear hereinafter as the description proceeds.

The α-cyano-β,β-diphenylacrylic acid derivatives which are contemplated in this invention are devoid of nitro groups and are characterized by the following general formula

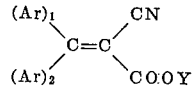

wherein $(Ar)_1$ and $(Ar)_2$ represent aromatic carbocyclic nuclei devoid of nuclear bonded amino groups and Y is alkyl of at least six carbon atoms.

The following specific alkyls are contemplated:

n-Hexyl
Iso-hexyl and the other isomeric hexyls
n-Heptyl
Iso-heptyl and the other isomeric heptyls
n-Primary nonyl (nonyl-1)
Nonyl-(2)
Nonyl-(3)
Nonyl-(5)
2-methyl-octyl-2
4-ethyl-heptyl-4
2-methyl-4-ethyl-hexyl-4
n-Primary octyl
Octyl-(2) (capyryl)
2-methyl-3-ethyl-pentyl-3
2,2,4-trimethyl-pentyl-4
2-ethyl-hexyl-1
3-ethyl-hexyl-3

2-methyl-heptyl-2
3-methyl-heptyl-3
4-methyl-heptyl-4
n-Primary decyl (decyl-1)
Decyl-4 (secondary decyl)
2-ethyl-octyl-3 (tertiary decyl)
4-propyl-heptyl-4 (tertiary decyl)
Undecyl-1 (n-primary decyl)
Undecyl-2 (n-secondary decyl)
Dodecyl-1 (n-dodecyl)
Tridecyl-1 (n-tridecyl)
Tridecyl-7
3-ethyl-undecyl
Tetradecyl-1 (n-tetradecyl)
Pentadecyl-1 (n-pentadecyl)
Pentadecyl-8
Hexadecyl (cetyl)
Heptadecyl-9
Octadecyl-1
2-methyl heptadecyl-2
Eicosyl-1
Docosyl-1
Tricosyl-12
Tetracosyl
Tricapryl
Pentacosyl
Hexacosyl
Heptacosyl
Octacosyl
Nonacosyl
Myristyl (30 carbons)

The aromatic carbocyclic nuclei $(Ar)_1$ and $(Ar)_2$ are preferred phenyl or substituted phenyl but may also represent naphthyl and the like. Among the substituents which may be present in $(Ar)_1$ and $(Ar)_2$ are:

Alkyl, e.g.:
    Methyl
    Ethyl
    n-Propyl, etc.
Halogen
Hydroxy
Alkoxy
Carboxy
Carbonamide
Sulfonamide
Cyano
Carbalkoxy
Acyloxy
Aryl, e.g.;
    Phenyl
    Tolyl
    Xenyl
Substituted aryl, e.g.:
    Halophenyl
    Cyanophenyl
    Carboxyphenyl, etc.

Among the specific benzophenone compounds which may be employed in the preparation of the compounds of this invention are the following:

2-chlorobenzophenone
2-fluorobenzophenone
3-fluorobenzophenone
3-chloro-2-hydroxy-5-methylbenzophenone
4'-chloro-3-methoxybenzophenone
2-chloro-4'-methylbenzophenone
2-chloro-4'-phenylbenzophenone
4'-chloro-2,4,6-trimethylbenzophenone
5,5'-dibromo-2,2'-dimethoxybenzophenone
2-hydroxy-4-methylbenzophenone
2-hydroxy-4-methylbenzophenone
2-hydroxy-5-methylbenzophenone
4-hydroxy-2-methylbenzophenone
4-hydroxy-3-methylbenzophenone
2-methoxy-5-methylbenzophenone
4-methoxy-4'-methylbenzophenone
2,6-dimethoxy-3'-methylbenzophenone
2,5-dimethoxy-3,4-dimethylbenzophenone
4,4'-dimethoxy-3,3'-dimethylbenzophenone
4-octylbenzophenone
2,3,4,5,6-pentachlorobenzophenone
2,4,6-trimethyl-2',6'-diphenylbenzophenone
5,5'-dibromo-2,2',4,4'-tetramethoxybenzophenone
3,5-dichloro-2,2',4',6-tetramethoxybenzophenone
3',5'-dichloro-4'-hydroxy-2,4,6-trimethylbenzophenone
2,5-dimethyl-3,4-diphenylbenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzopehnone
Benzophenone carboxylic acid (2)
Benzophenone carboxylic acid (3)
Benzophenone carboxylic acid (4)
2-benzoyl benzoic acid methyl ester
2-benzoyl benzoic acid ethyl ester
2-benzoyl benzoic acid amide
2-benzoyl benzoic acid monoethyl amide
3-benzoyl benzoic acid methyl ester
3-benzoyl benzoic acid ethyl ester
4-benzoyl benzoic acid methyl ester
4-benzoyl benzoic acid ethyl ester
2-sulfamide benzophenone
4-sulfamide benzophenone
2-phenyl benzophenone
2-benzoyl benzophenone
4,4'-di-toluyl benzophenone
3-phenyl benzophenone
4-phenyl benzophenone
N,N-dimethyl-2-sulfonamido benzophenone
2-carboxamido benzophenone
2-hydroxybenzophenone
3-hydroxybenzophenone
3-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)-benzophenone
4-(p-tolyloxy)-benzophenone
2-acetoxybenzophenone
4-isopentyloxybenzophenone
3-acetoxybenzophenone
4-acetoxybenzophenone
4-cyclohexyloxybenzophenone
4-benzyloxybenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone 4,4'-diiodobenzophenone
3,5'-diiodobenzophenone
4-chloro-4'-bromobenzophenone
2,2'-diiodobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
4(p-methoxyphenyl)-4'-phenylbenzophenone
4(p-hydroxyphenyl)-benzophenone
3-chloro-4(2-hydroxyethoxy)-benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4'-bromo-4-hydroxybenzophenone
4-bromo-4-ethoxybenzophenone
3-iodo-4-methoxybenzophenone
3-iodo-4-hydroxybenzophenone
4'-iodo-4-ethoxybenzophenone
2-chloro-2'-bromo-4-hydroxybenzophenone
3,5-dibromo-4-hydroxybenzophenone
3,5-diiodo-4-hydroxybenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
2,2'-dihydroxy-4,4'-dipropoxybenzophenone
3,3'-dimethoxy-4,4'-bis(benzyloxy)-benzophenone In addition to the above contemplated derivatives, polyoxyalkylated derivatives of those compounds containing at least one reactive hydrogen atom are within the purview of this invention. From the compounds herein contemplated, the reactive hydrogen containing compounds are the hydroxy compounds, amides and sulfonamides. These are reacted with an alkylene oxide or a compound functioning as an oxide such as ethylene oxide, propylene oxide, butylene oxide, butylene dioxide, cyclohexane oxide, glycidol, epichlorohydrazin, butadiene dioxide, isobutylene oxide, styrene oxide and mixtures thereof, and the like, to yield the corresponding polyoxyalkylated product. The resultant hydroxy derivatives, e.g., have the following general formula:

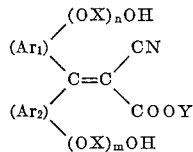

wherein X represents the hydrocarbon residue of the oxyalkylating agent, for example, ethylene (from ethylene oxide and epichlorohydrin), propylene (from propylene oxide), etc. and n and m are integers from 0 to about 100 except that at least one of these is at least 1 and wherein n and m represent the moles of oxyalkylating agent condensed with the hydroxy compound.

The general method for preparing the compounds of this invention involves a condensation of benzophenone or a substituted-benzophenone with an alkylcyanoacetate in a suitable solvent or under such conditions that dehydration occurs to form the desired acrylic acid derivative.

The following examples will serve to illustrate the present invention without being deemed limitative thereof. Parts are by weight unless otherwise indicated.

EXAMPLE 1

Preparation of α-cyano-β,β-diphenylacrylic lauryl ester:
This compound is prepared by the condensation of benzophenone with laurylcyanoacetate. The latter is prepared by combining 2 moles of cyano acetic acid, 2.3 moles of lauryl alcohol and 1% toluene sulfonic acid based upon the total weight of reactants. The reaction mixture is heated to reflux temperatures, i.e., about 100° C. and water is distilled off as it is formed during the reaction. After the reaction has been completed as evidenced by the lack of any further water evolution, the reaction mixture is neutralized to a pH of 7.

0.8 mole of the above described lauryl ester is mixed with 0.75 mole of benzophenone
3 g. of ammonium acetate
150 cc. of benzene, and
23 cc. glacial acetic acid and placed in a flask fitted with a stirrer, thermometer, reflux condenser, and heating mantle. The charge is heated to 100° C. and there is then added dropwise at the rate of 5 cc. per hour, a mixture of 15 g. of ammonium acetate in 36 cc. of glacial acetic acid. The reaction is carried out for 27 hours with constant stirring at 100° C. while water and benzene are distilled off. The benzene is recycled and the water is discarded. The benzene is then evaporated off from the reaction mixture in the flask, the latter is extracted with water and then vacuum distilled. The product distills at 255–260° C. at 0.5 mm. of mercury.

EXAMPLE 2

Example 1 is repeated except that in place of the lauryl ester, 2-ethylhexyl ester is prepared. The 2-ethylhexylcyano acetate is made in a manner similar to the laurylcyanoacetate above described except that an equivalent weight of 2-ethylhexyl alcohol is used in place of lauryl alcohol. The resultant 2-ethylhexyl ester of α-cyano-β,β-diphenylacrylic acid has a boiling point of 205–209° C. at 0.9 mm. of mercury and has a K value=35.5 at 303 millimicrons. This ester exhibits infinite solubility, i.e., complete miscibility, in such diverse solvent media as methyl alcohol, n-butyl alcohol, ethyl acetate, mineral oil, hexane and toluene.

EXAMPLE 3

The n-octyl ester of α-cyano-β,β-diphenyl acrylic acid is prepared again, similarly as the esters of the preceding examples employing the corresponding n-octylcyanoacetate which, again, is prepared similarly as the lauryl ester using an equivalent weight of n-octyl alcohol in place of lauryl alcohol. The n-octyl ester has a boiling point of 213–214° C. at 1.4–1.7 mm. of mercury. The product has a K value=36.1 at 302 millimicrons.

The following examples set forth in Table I the indicated aliphatic alcohols employed to prepare the corresponding cyanoacetate esters as in Example 1 and are then condensed with benzophenone in the manner of the preceding examples to yield the corresponding esters.

*Table I*

| Example: | Alcohol |
|---|---|
| 4 | n-Hexyl. |
| 5 | Isohexyl. |
| 6 | n-Heptyl. |
| 7 | Nonyl-1. |
| 8 | Nonyl-5. |
| 9 | 2-methyloctyl-2. |
| 10 | 4-ethylheptyl-4. |
| 11 | 2-methyl-3-ethylpentyl-3. |
| 12 | 3-ethylhexyl-3. |
| 13 | Decyl-1. |
| 14 | 4-propylheptyl-4. |
| 15 | Dodecyl-1. |
| 16 | Tridecyl-1. |
| 17 | Cetyl. |
| 18 | Octacetyl-1. |
| 19 | Tricapryl. | thereof per mole of base compound, range from soluble to very soluble in water with the solubility increasing as the number of oxyalkylene groups increases.

The ultra-violet absorbing compounds of the present invention may be used to stabilize all organic materials which are susceptible to ultra-violet degradation and are particularly useful in the stabilization of resins and plastics, whether they be in the form of films or molded products and either clear, opaque, semi-opaque or translucent. Foam, plastics and fibers are also admirably stabilized by these compounds. Pigments, polishes, creams, lotions, paints, enamels, varnish films and dyestuffs when susceptible to ultra-violet degradation have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope or spirit thereof.

We claim:
1. A compound of the formula:

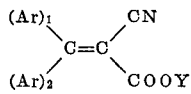

wherein $(Ar)_1$ and $(Ar)_2$ are aromatic carbocyclic nuclei of the benzene and napthalene series and devoid of nitro and nuclear bonded amino groups and are independently selected from the group consisting of phenyl, alkyl phenyl, halo phenyl, hydroxy phenyl, alkoxy phenyl, hydroxyalkoxy phenyl, carboxy phenyl, carboxamido phenyl, sulfonamido phenyl, carbalkoxy phenyl, cyano phenyl, acetyl phenyl, benzoyl phenyl, phenyl substituted phenyl, alkyl phenyl substituted phenyl, phenoxy phenyl alkyl substituted phenoxy phenyl, alkoxy phenyl substituted phenyl, hydroxy phenyl substituted phenyl, and naphthyl and Y is an alkyl group of at least six carbon atoms.

2. A compound as defined in claim 1 wherein $(Ar)_1$ and $(Ar)_2$ are phenyl.
3. A compound as defined in claim 1 wherein $(Ar)_1$ and $(Ar)_2$ are halo phenyl.
4. A compound as defined in claim 1 wherein $(Ar)_1$ is phenyl and $(Ar)_2$ is alkyl phenyl.
5. A compound as defined in claim 2 wherein Y is 2-ethyl hexyl.
6. A compound as defined in claim 2 wherein Y is n-octyl.
7. A compound as defined in claim 2 wherein Y is lauryl.
8. A compound as defined in claim 3 wherein Y is 2-ethyl hexyl.
9. A compound as defined in claim 3 wherein Y is n-octyl.
10. A compound as defined in claim 3 wherein Y is lauryl.
11. A compound as defined in claim 4 wherein Y is 2-ethyl hexyl.
12. A compound as defined in claim 4 wherein Y is n-octyl.
13. A compound as defined in claim 4 wherein Y is lauryl.
14. 2-ethyl hexyl α-cyano-β,β-diphenyl acrylate.
15. Lauryl α-cyano-β,β-diphenyl acrylate.
16. 2-ethyl hexyl α-cyano-β-phenyl-β(3,4- dimethylphenyl) acrylate.
17. n-octyl-α-cyano-β-phenyl - β(3,4 - dimethylphenyl) acrylate.

References Cited by the Examiner
UNITED STATES PATENTS

| 2,465,318 | 3/49 | Seymour | 260—465 |
| 3,081,280 | 3/63 | Carlson | 260—45 |

OTHER REFERENCES

Cope et al.: Journal of American Chemical Society, 1941, volume 63, pages 3452–56.

CHARLES B. PARKER, *Primary Examiner.*